United States Patent
Brown et al.

(10) Patent No.: US 12,536,458 B2
(45) Date of Patent: Jan. 27, 2026

(54) SYSTEM AND METHOD FOR MAPPING QUANTUM CIRCUITS TO IONS IN A STORAGE RING QUANTUM COMPUTER ARCHITECTURE

(71) Applicant: United States Department of Energy, Washington, DC (US)

(72) Inventors: Kevin A Brown, Stonybrook, NY (US); Thomas G Robertazzi, Mastic, NY (US)

(73) Assignee: U.S. Department of Energy, Washington, DC (US)

( * ) Notice: Subject to any disclaimer, the term of this patent is extended or adjusted under 35 U.S.C. 154(b) by 885 days.

(21) Appl. No.: 17/706,741

(22) Filed: Mar. 29, 2022

(65) Prior Publication Data
US 2022/0318662 A1 Oct. 6, 2022

Related U.S. Application Data

(60) Provisional application No. 63/167,705, filed on Mar. 30, 2021.

(51) Int. Cl.
*G06N 10/40* (2022.01)
*G06F 30/30* (2020.01)
*G06N 10/20* (2022.01)

(52) U.S. Cl.
CPC .............. *G06N 10/40* (2022.01); *G06F 30/30* (2020.01); *G06N 10/20* (2022.01)

(58) Field of Classification Search
CPC ......... G06N 10/40; G06N 10/20; G06F 30/30
USPC .......... 716/100; 977/759; 359/248, 280, 305
See application file for complete search history.

(56) References Cited

U.S. PATENT DOCUMENTS

| | | | | |
|---|---|---|---|---|
| 5,010,555 A | * | 4/1991 | Madey | H01S 3/0903 372/100 |
| 5,340,976 A | * | 8/1994 | Taniguchi | G01T 1/28 250/459.1 |
| 5,680,018 A | * | 10/1997 | Yamada | H05H 7/06 378/119 |
| 6,081,643 A | * | 6/2000 | Lentink | G21K 1/06 385/130 |
| 6,495,854 B1 | * | 12/2002 | Newns | B82Y 10/00 977/933 |
| 7,110,503 B1 | * | 9/2006 | Kumakhov | G21K 1/06 378/85 |
| 8,106,717 B2 | * | 1/2012 | Ichimura | G02F 3/00 977/933 |
| 11,320,588 B1 | * | 5/2022 | Mazed | G06N 10/40 |

(Continued)

OTHER PUBLICATIONS

Beausoleil et al., "Beyond the qubit: quantum computing, near-term alternatives and Memory-Driven Computing", Hewlett Packard Labs, Nov. 2019, 11 pages. (Year: 2019).*

(Continued)

*Primary Examiner* — Phallaka Kik
(74) *Attorney, Agent, or Firm* — Timothy L. Harney; Aaron Keith; Nathaniel Sloan

(57) ABSTRACT

One or more embodiments relates to a system and method for storing information in a storage ring. One embodiment relates to an architecture including at least one laser adapted to target and process at least one qubit in the storage ring; and an optical pathway in optical communication with the at least one laser, enabling the laser to process the at least one qubit.

5 Claims, 9 Drawing Sheets

(56) References Cited

U.S. PATENT DOCUMENTS

| | | | | |
|---|---|---|---|---|
| 11,328,216 | B2* | 5/2022 | Monroe | G06N 10/80 |
| 11,460,877 | B2* | 10/2022 | Najafi-Yazdi | G06N 10/40 |
| 11,723,296 | B2 | 8/2023 | Brown et al. | |
| 11,839,168 | B2 | 12/2023 | Brown et al. | |
| 2003/0002674 | A1* | 1/2003 | Nambu | H04L 9/0852 |
| | | | | 505/202 |
| 2008/0137858 | A1* | 6/2008 | Gelfond | H04B 10/70 |
| | | | | 380/256 |
| 2019/0205783 | A1* | 7/2019 | Nam | G06F 17/14 |
| 2021/0137469 | A1* | 5/2021 | Zhao | A61B 6/4233 |
| 2021/0158200 | A1* | 5/2021 | Monroe | H04L 9/0858 |
| 2021/0343939 | A1* | 11/2021 | Brown | G11C 11/54 |
| 2021/0365827 | A1* | 11/2021 | Monroe | G06N 10/40 |
| 2022/0101169 | A1* | 3/2022 | Nam | G06N 10/00 |
| 2022/0223301 | A1* | 7/2022 | Solomey | B64G 1/66 |
| 2022/0343203 | A1* | 10/2022 | Brown | G06N 5/01 |
| 2023/0075435 | A1* | 3/2023 | Saito | H01S 3/10061 |
| 2023/0376817 | A1* | 11/2023 | Bartlett | G06N 10/20 |

OTHER PUBLICATIONS

Chen et al., "Controllably releasing long-lived quantum memory for photonic polarization qubit into multiple spatially-separate photonic channels", Scientific Reports, 26 Sep. 26, 2016, 7 pages. (Year: 2016).*

Chen et al., "Scalable and High-Fidelity Quantum Random Access Memory in Spin-Photon Networks", PRX Quantum 2, Aug. 3, 2021, 19 pages. (Year: 2021).*

Cho et al., "Highly efficient optical quantum memory with long coherence time in cold atoms", Optica, vol. 3, No. 1, Jan. 2016, 8 pages. (Year: 2016).*

Cricchio et al., "Dynamic clock generator and memory mass device using quantum ring driven by three-color laser fields", Royal Society of Chemistry, Jul. 29, 2021, 15 pages. (Year: 2021).*

Ma et al., "Optical quantum memory based on electtromagnetically induced transparency", NIST Author Manuscript, Apr. 2017, 47 pages. (Year: 2017).*

Minnegaliev et al., "Realization of the revival of silenced echo (ROSE) quantum memory scheme in orthogonal geometry", AIP Conf. Proc., 1936, 5 pages. (Year: 1936).*

StanfordReport, "Stanford engineers propose a simpler design of quantum computers", Science & Engineering, Nov. 29, 2021, 5 pages. (Year: 2021).*

University of Warsaw, "Quantum memory with record-breaking capacity based on laser-cooled atoms", Phys.org, Dec. 18, 2017, 3 pages. (Year: 2017).*

Brown and Roser, Towards storage rings as quantum computers, Physical Review Accelerators and Beams, 2020, 054701, 23.5, American Physical Society 23.5.

Shaftan and Blinov, Cold ion beam in a storage ring as a platform for large-scale quantum computers and simulators: Challenges and directions for research and development, Physical Review Accelerators and Beams, 2021, 094701, 24.9, American Physical Society.

* cited by examiner

SYSTEM AND METHOD FOR MAPPING QUANTUM CIRCUITS TO IONS IN A STORAGE RING QUANTUM COMPUTER ARCHITECTURE

CROSS-REFERENCE TO RELATED APPLICATION

This application claims the benefit of U.S. Provisional Patent Application No. 63/167,705 filed Mar. 30, 2021, which is incorporated herein by reference in its entirety.

STATEMENT OF GOVERNMENT SUPPORT

The United States Government has rights in this invention pursuant to Contract No. DE-SC0012704 between U.S. Department of Energy and Brookhaven National Laboratory.

FIELD OF THE INVENTION

Embodiments relate to a quantum computer. More specifically embodiments relate to a system and method for mapping quantum circuits to ions in a storage ring quantum computer architecture.

BACKGROUND

Embodiments relate to implementing quantum circuits on a storage ring quantum computer. A storage ring quantum computer is a particle accelerator (generally circular in form, although with straight sections it can take on other shapes, including triangular, square, hexagonal, and the like) that uses circulating ions to store quantum qubit information. Quantum computing operations may be performed on the circulating ions/quantum bits (alternatively referred to as qubits). Vacuum chamber windows on the storage ring allow lasers to interact with the ions to perform quantum computing operations. A qubit, in a storage ring quantum computer, may either exist in an internal quantum eigenstate of the individual ions or in an external quantum eigenstate of a chain of ions forming an ion Coulomb crystal. Any architecture would include a system (i.e., lasers to excite quantum states) to write and measure these qubits.

Non-circular, linear, ion traps may use ions to store quantum information and perform quantum computing operations upon the ions. The implementation of a storage ring quantum computer (SRQC) is substantially different from a linear ion trap in that the ions rotate away from a point on the storage ring with time while the ions in a linear ion trap are stationary. This brings new challenges in making a working storage ring quantum computer.

A need exists in the art for implementing quantum circuits on a storage ring quantum computer SRQC.

SUMMARY

One or more embodiments relates to mapping of quantum circuits to qubits represented by ion states in a storage ring quantum computer. Serial; parallel and hybrid architectures for mapping such qubits onto a storage ring quantum computer are presented.

One or more embodiments relates to an architecture for storing information in a storage ring. The architecture includes at least one laser adapted to target and process at least one qubit in the storage ring; and an optical pathway in optical communication with the at least one laser, enabling the laser to process the at least one qubit. One or more embodiments of the architecture may include at least one window defined in the storage ring and in optical communication with the at least one laser and/or at least one feed trough defined in the storage ring and housing at least one fiber optic cable, enabling the laser to process the at least one qubit. Embodiments may include vacuum chamber walls defining a vacuum chamber wherein the at least one optical pathway is in optical communication with the vacuum chamber, such that at least one deflector (an acoustic optical deflector for example) is in optical communication with the at least one laser and the optical pathway.

Still another embodiment relates to a quantum computer storage ring. The quantum computer storage ring includes vacuum chamber walls defining a vacuum chamber; an optical transmission system coupled to at least one of the vacuum chamber walls in optical communication with and providing optical access to the vacuum chamber; and at least one laser in optical communication with the optical transmission system. In one or more embodiments, the optical transmission system could include at least one window defined in at least one of the vacuum chamber walls and in optical communication with the at least one laser and the at least one deflector, at least one feed trough defined in at least one of the vacuum chamber walls and housing at least one fiber optic cable in optical communication with the at least one laser and some combinations thereof. Embodiments may include a plurality of lasers, a plurality of windows and/or a plurality of deflectors, wherein one laser is in optical communication with one window and one deflector, a plurality of lasers are in optical communication with one window and one deflector, one laser is in optical communication with one of the fiber optic cables, a plurality of fiber optic cables, wherein a plurality of lasers are in optical communication with the fiber optic cables or combinations thereof.

Yet another embodiment relates to a method of processing a plurality of qubits. The method includes providing the plurality of qubits in a spaced relationship such that at least two qubits are in spaced relationship to each other and processing the qubits using at least one laser. The method includes providing the plurality of qubits in a serial spaced relationship, a parallel spaced relationship and/or a hybrid spaced relationship.

The following articles are incorporated herein by reference in their entirety:
1. Alexandre A. A. de Almeida, Gerhard W. Dueck, Alexandre C. R. da Silva, CNOT Gate optimizations via qubit permutations for IBM's quantum architectures, J. of Low Power Electronics, 15 (2019), 182-192.
2. J.-H. Bae, Paul M. Alsing, et. al., Quantum circuit optimization using quantum Karnaugh maps, Scientific Reports, Nature Research (2020).
3. Chris Bernhardt, Quantum Computing for Everyone, MIT Press, 2019.
4. Kevin A. Brown, Thomas Roser, Towards Storage rings as quantum computers, Phys. Rev. Accel. Beams, 23 (054701) (2020).
5. David Deutsch, Quantum computational networks, Proceedings of the Royal Society, London, A, 425 (1989) 73-90.
6. David P. DiVincenzo, Quantum gates and circuits, Proc. Of the Royal Society, London, A, 454 (1998) 261-276.
7. Christopher J. Foot, Atomic Physics, Oxford University Press, 2005.

8. Phillip Kaye, Raymond LaFlamme and Michele Mosca, An Introduction to Quantum Computing, Oxford University Press, 2007.
9. Dave Kielpinski, Christopher Monroe, David J. Wineland, Architecture for large-scale ion-trap quantum computer, Nature, 417 (2002) 709-711.
10. Abhoy Kole, Kamalika Datta, Indranic Sengupta, A heuristic for linear nearest neighbor realization of quantum circuits by SWAP gate insertion using N-gate lookahead, IEEE J. on Emerging and Selec. Topics in Circuits and Systems, 6 (1) (2016) 62-72.
11. Norbert M. Linke, Dimitri Maslov, Martin Roetteler et. al., Experimental comparison of two quantum computer architectures, Proc. of the National Academy of Sciences, 114 (13) (2017) 3305-331.
12. Prakash Murali, Ali J. Abhari, Norbert M. Linke, Architecting noisy intermediate-scale quantum computers: a real-system study, IEEE Micro, (2020) 73-80.
13. Michael A. Nielsen and Isaac L. Chuang, Quantum Computation and Quantum Information, Cambridge, 2000.
14. Md. Mazder Rahman, Gerhard W. Dueck, et. al., Integrated syn-thesis of linear nearest neighbor ancilla-free MCT circuits, in: Proc. of the 2016 IEEE 46th Inter. Sym. on Multiple-Valued Logic (2016).
15. R. Roloff, M. Wenin, W. Potz, Optimal control for open quantum systems: qubits and quantum gates, J. of Computational and Theo. Nanoscience, 6 (8) (2009) 837-1863.
16. Abdullah A. Saki, Rasit O. Topaloglu and Swaroop Ghosh, Muzzle the shuttle: efficient compilation for multi-trap trapped-ion quantum computers, arXiv: 2111.07961v1, 2021.
17. T. Schatz, U. Schramm, D. Habs, Crystalline ion beams, Nature 412 717720 (2001).
18. A. Steane, The ion trap quantum information processor, Applied Physics B (64) (1997) 623-643.
19. Boyan Tabakov, Francisco Benito, Matthew Blain, et. al., Assembling a ring-shaped crystal in a microfabriacted surface ion trap, Phys. Rev. Applied 4 (2015) 0031001.
20. J. Wei, A. M. Sessler, Crystalline beams, Proc. 18th Advanced ICFA Beam Dynamics Workshop on Quantum Aspects of Beam Physics, P. Chen Editor, SLAC-Report 574 (2003) 182.
21. David J. Wineland, Christopher Monroe, et. al., Experimental issues in coherent quantum-state manipulation of trapped ions, J. of Res. of the National Institute of Standards and Technology 103 (1998) 259-328.
22. David J. Wineland, et. al., Experimental primer on the trapped ion quantum Computer, Fortschr. Phys. 46 (4-5) (1998) 363-390.
23. Xin-Chuan Wu, Diripto M. Debroy, Yongshon Ying, et. al., TILT: Achieving higher fidelity on a trapped-ion linear-tape quantum computer architecture, Proc. 2021 IEEE International Symposium on High Performance Computer Architecture (HPCA), (2021).
24. Alwin Zulehner, Alexandru Paler, Robert Willie, An efficient method-ology for mapping quantum circuits to the IBM QX architecture, IEEE Trans. on Computer and Design of Integrated Circuits, 18 (7) (2019) 1226-1236.

The following patents and patent applications are incorporated herein by reference in their entirety:
1. S. Daraeizadeh et. al., Apparatus and Method for Quantum Performance and/or Error Correction Enhancement using Multi-Qubit Gates, U.S. Patent Application No. US 2020/0242208 A1.
2. K. Brown et al., Storage Ring Quantum Computer, U.S. Patent Application No. 202110343939.
3. S. Daraeizadeh et. al., Apparatus and Method for Quantum Performance and/or Error Correction Enhancement using Multi-Qubit Gates, U.S. Patent Application Publication, Pub. No. US 2020/0242208 A1.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION

Figure 1:
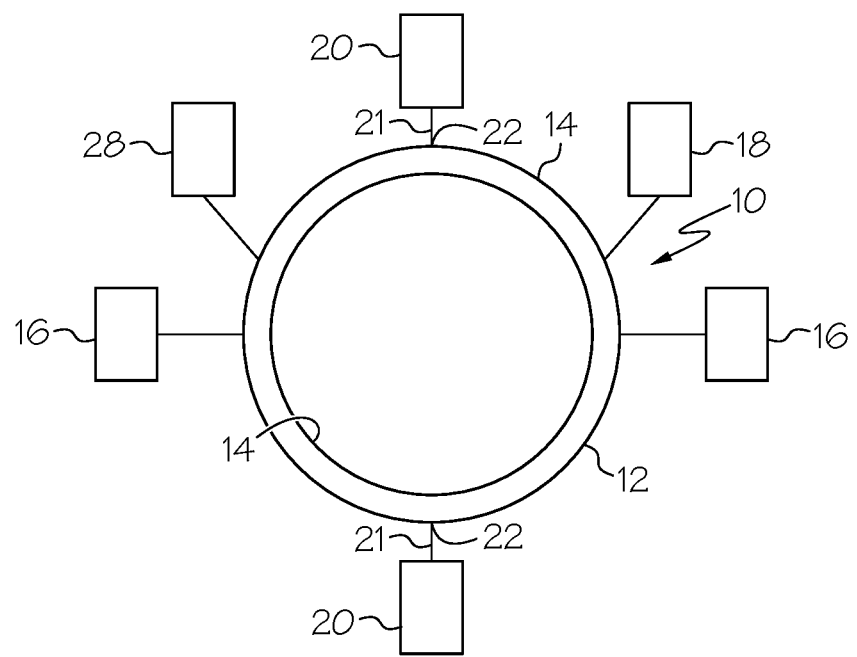
FIG. 1 depicts a block diagram of a storage ring in accordance with one embodiment of the present invention.

The following detailed description should be read with reference to the drawings in which similar elements in different drawings are numbered the same. The drawings, which are not necessarily to scale, depict illustrative embodiments and are not intended to limit the scope of the invention.

One or more embodiments relates to a storage ring quantum computer (SRQC) similar to a particle accelerator device referred to as a circular radio frequency quadrupole (CRFQ). A CRFQ may be viewed as an unbounded Paul trap. A CRFQ need not be large. In one embodiment, the CRFQ is one meter in circumference yet may hold thousands of ions.

It should be appreciated that to view the quantum mechanical phenomena in a classical particle beam, the beam must be cooled to very low temperatures. There are two fundamental states of matter that may be created by bringing a beam's temperature to a very low value:

1) classical crystalline beam; and 2) ultracold crystalline beam.

Classical crystalline beams comprise a cluster of circulating, charged particles in their classical lower energy state influenced by circumferentially varying guiding and focusing electro-magnetic forces and Coulomb interacting forces. Ultracold crystalline beam, the second state of matter, is an ultracold crystalline beam which will be referred to as an ion Coulomb crystal. This state of matter is cooled to well below the Doppler cooling limit and within the Lamb-Dicke regime.

This is within the regime where couplings between internal and external quantum states are not excessively suppressed and is far above the temperature for a Bose-Einstein condensate.

Several quantum properties have the potential to be taken advantage of in a classical crystalline beam using standard measurement methods. These properties include the crystalline orbit modes, the spin states of particles and emittance quantization among others. It should be appreciated that these properties may be difficult to control due to the high temperatures of the beams. They thus may not be of practical use for computation. An ultracold crystalline beam operates at low enough temperatures that the quantum mechanical properties of ions can be accessed for use in computational processes.

In a storage ring, groups of ions can be isolated from each other by means of longitudinal rf potentials, or by separation thru the modulation of the velocity in the cooling system. This creates isolated groups of ions holding specific qubit information that can be operated on independently. In a multiplex environment in linear ion traps, a storage ring could hold thousands of smaller individual crystals. Such numerous small chains could be used for purposes such as quantum circuit implementation, systematic analysis or quantum memory.

Quantum circuits are interconnections of quantum gates that can accomplish some desired overall function. Quantum circuits are used for purposes such as teleportation, super dense coding, and error correction. Quantum gates include well known gates such as the H, CNOT, SWAP, I, Z, X and Y gates.

It should be appreciated that, at a fundamental level for a storage ring quantum computer, a quantum gate operating on a set of qubit inputs leaves the "output qubits" in the same locations (or subset/super-set of locations) as the original input qubits. Thus, it is not that one is implementing a traditional electric-like circuit with physically distinct gates is being implemented that may be pointed to in a physical circuit, taking inputs at one location and producing outputs at different location(s) (See FIG. 2). Rather the quantum circuit diagram indicates the pattern and timing of operations that can be performed on ions with output qubits generally (but not always) in the same location(s) as input qubits.

FIG. 1 depicts a high-level block diagram of a storage ring or SRQC, generally designated 10, in accordance with one embodiment of the present invention. FIG. 1 illustrates the SRQC has a housing or containment 12 having walls 14. As illustrated, SQRC 10 includes read and write units 16 coupled to and in communication therewith. Read and write units 16 enable users to read and write to the qubits. Storage ring 10 may further include a unit 18 that allows for injection of an ion beam, and one or more lasers 20 (two are illustrated)) for generating and applying one or more laser beams to process or cool the ions to an extremely low temperature so that the quantum states in the motion of the qubits are observable. In the illustrated embodiment, lasers 20 are shown communicating with an optical path or an optical transmission system 21. In the illustrated embodiments, the optical path or optical transmission system comprises windows 22 in containment 12. SQRC 10 is shown having a diagnostic instrumentation unit 28 coupled to and communicating with the storage ring 10. It should be appreciated that while two units 16 and 20, two windows 22, one unit 18 and 28 are illustrated, a differing number of each unit is contemplated.

Figure 2:
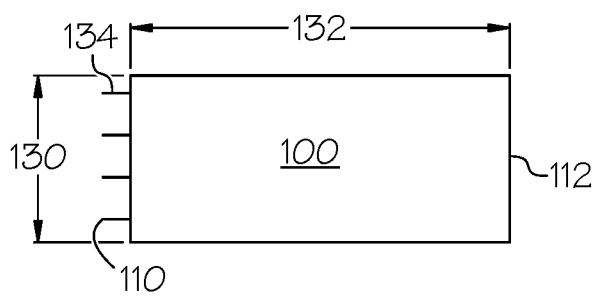
FIG. 2 depicts a block diagram of a quantum circuit as a rectangle with inputs at the left and outputs in accordance with one embodiment.

In one or more embodiments, the storage ring 10 creates an ultracold beam forming an ion Coulomb crystal. In at least one embodiment, the Coulomb crystal binds a chain of ions into a lattice structure in which the ions remain locked in sequence despite the mutual Coulomb repulsion force between the positively charged ions. In one embodiment of the invention, the thermal vibrations of the ions are cooled to an extremely low temperature, so that the quantum states in the motion of the ions are observable. One or more embodiments further includes employing Doppler and Raman laser cooling, FIG. 2 depicts a high-level block diagram of a layout of a quantum circuit, generally designated 100. As illustrated, quantum circuit 100 is depicted as a rectangle with inputs 110 (shown on the left of the figure) and outputs 112 (shown on the right of the figure). Internally, the quantum circuitry consists of an interconnection of quantum gates (not shown) which may be viewed as being arranged in "stages". It is contemplated that quantum circuit 100 includes a "width" 130 and a "depth" 132. As illustrated, the "width" 130 of the circuit 100 comprises the number of inputs 110 or (parallel) wires 134 while the "depth" 132 of circuit 100 comprises the number of stages.

It is contemplated that circuit 100 may be considered as being divided into several discrete time slices (not shown) where the application of a single gate involves a single time slice. Then the depth 132 of circuit 100 is defined as the number of time slices from when inputs 110 are presented to circuit 100 to when circuit outputs 112 appear. It should be appreciated that, since the gates may operate in parallel, the number of time slices usually does not equal the number of gates in the circuit.

It should be appreciated that a "gate" may be expressed as an equivalent interconnection of more basic gates. Sometimes gates entangle multiple qubits. Finally, each logical qubit may be represented as a number of physical qubits (i.e., ions and their states).

In at least one embodiment, in an ion trap system and the SRQC system, going from a quantum circuit 100 with traditional quantum gates to a mapping of a circuit 100 to the ions comprises a three-step process:

1). Implementing the traditional quantum circuit (using gates such as CNOT, H, and the like);
2). Transforming this circuit into an equivalent circuit using only "native" or "hardware" gates (two gates for example, but a different number of gates are contemplated). In at least one embodiment these native gates are usually a one qubit gate and a two qubit gate that can be implemented naturally in a linear ion trap or the SRQC; and
3) Mapping the operations corresponding to the native gate circuit to the ions.

It is contemplated that one way to perform the laser operations corresponding to native gates is to use an optical pathway/optical transmission system (windows or fiber optic cables and the like) feeding into a storage ring thru which lasers can access the ions which can be placed equally spaced around the ring or unequally spaced (some closer to one another than equi-spacing would allow) to minimize the travel time between windows for a faster multi-window calculation.

Figure 3:
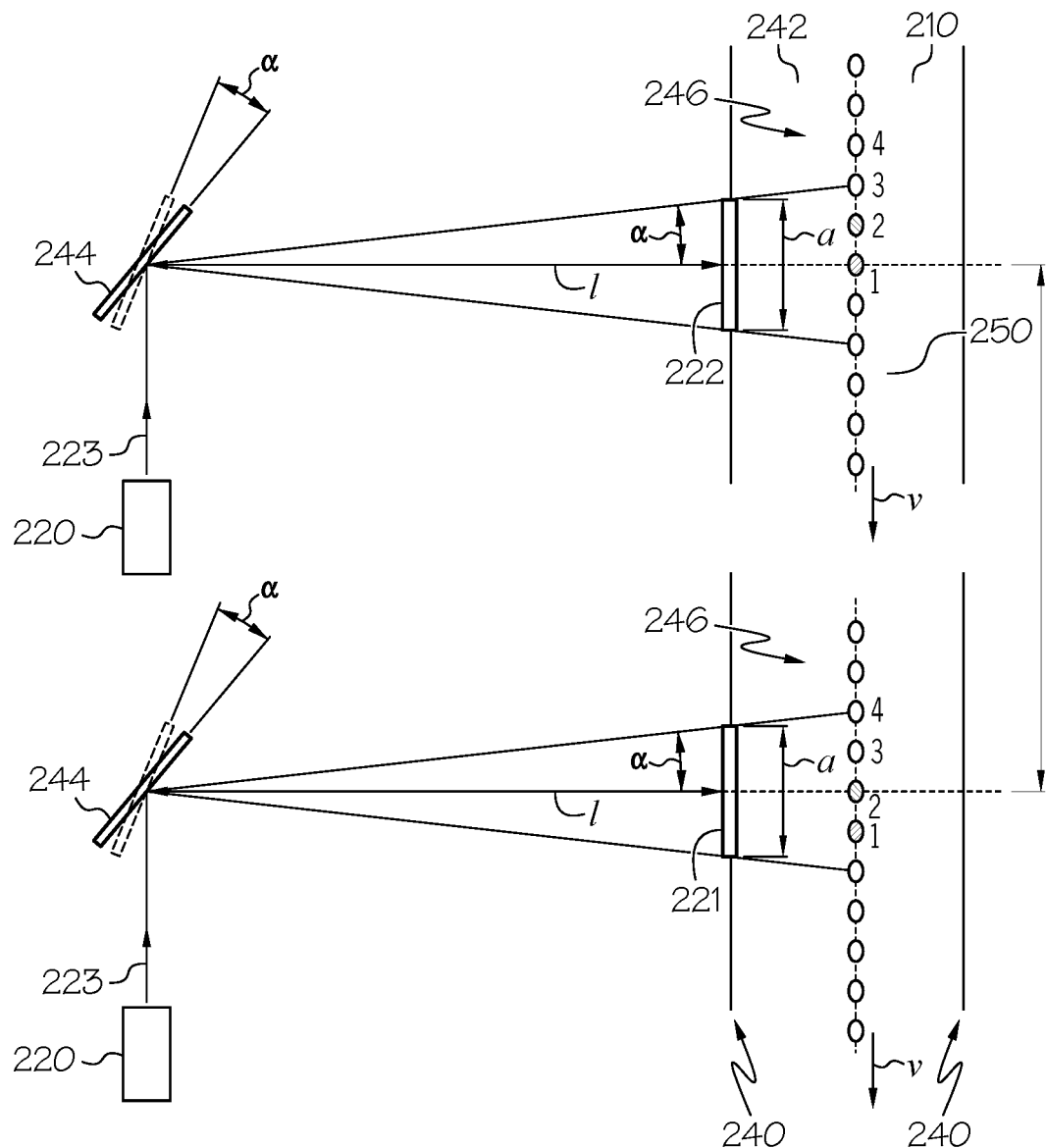
FIG. 3 illustrates a block diagram of a storage ring having an optical pathway/optical transmission system for processing qubits in accordance with one embodiment.

FIG. 3 illustrates a high level view of the architecture for performing laser operations and storing information in a storage ring, generally designated 210. As illustrated ring 210 includes two vacuum chamber walls 240 defining a vacuum chamber 242. In the illustrated embodiment, an optical pathway/optical transmission system (at least one window 222 or 221 for example) is defined by and in the storage ring 210, in the vacuum chamber walls 240 for example, and in optical communication with the vacuum chamber 242, and one or more lasers 220 generating laser light/pulse 223. As illustrated two windows 222 and 221 respectively are defined in vacuum chamber wall 240, enabling lasers 220 to process the at least one qubit 246, cooling the qubit 246.

Ring 210 further includes at least one deflector 244 in optical communication with at least one laser and at least one window. In the illustrated embodiment, the least one deflector comprises two acoustic optical deflectors 244. It should be appreciated that while two lasers 220, two windows 222-221, and two optical deflectors 244 are shown, more than two lasers, windows and deflectors are contemplated. Alternative embodiments contemplate one laser in optical communication with more than one optical deflector, and/or a plurality of lasers in optical communication with one window and one deflector.

Windows 222 and 221 are defined as having dimension (length) a, and spacing. Chains of ions or qubits 246 (two chains designated 250 and 252 respectively) have spacing d between individual ions. The chains travel past windows 222 and 221 with velocity v, passing window 222 at time t and window 221 at time $\Delta t_w$. As shown, chain 250 is shown proximate window 222 and chain 252 is shown proximate window 221.

The acoustic optical deflectors 244 redirect the laser beam/pulse by angle α and the distance the light travels is indicated by l. In at least one embodiment, the acoustic optical deflectors include a crystal (not shown). A high-frequency acoustic pulse is sent into the crystal, changing the index of refraction of the crystal and thereby changing the angle the laser light is bent when passing through the crystal. Therefore, the number of ions that fit in the window $322=n_w$.
Where $$n_w=[\alpha/d(1+rll)]$$

$$\Delta t_\alpha=\alpha/v$$

As provided, the window spacing is s. Thus the travel time between the two windows is $$\Delta t_w=s/v$$

It is contemplated that, in accordance with one or more embodiments, it is possible to perform the laser operations corresponding to native gates using windows 222/221 defined in the storage ring 210. The lasers 220 may be equally spaced around the ring 210 or unequally spaced (where some of the lasers are closer to one another than equal spacing would allow). Such an arrangement would minimize the travel time between windows 222/221 for a faster multi-window calculation. One or more lasers 220 may access the qubits through a window. Multiple lasers using a single window for access to ions/qubits are referred to as a "laser bank". Acoustic-optical modulators 244 could be used to spatially steer each laser beam 223. That is the acoustic-optical modulator 244 can point a laser beam 223 at an ion during part of all the ion's transit past the window.

In one or more embodiments, a specific number of consecutive qubits 246 (width) come in view of a windows 222/221 and lasers 220 on the storage ring 210. The qubits 246 are accessible to the lasers 220/221 for a specific amount of time until the qubits roll away. During this time the lasers 220/221 perform gate operations (cooling) on the qubits 246. Multiple depth-wise stages of the circuit may be implemented during this time. But the depth of a circuit to be implemented for those qubits 246 by the laser bank is limited by the time under the window/lasers.

Figure 4:
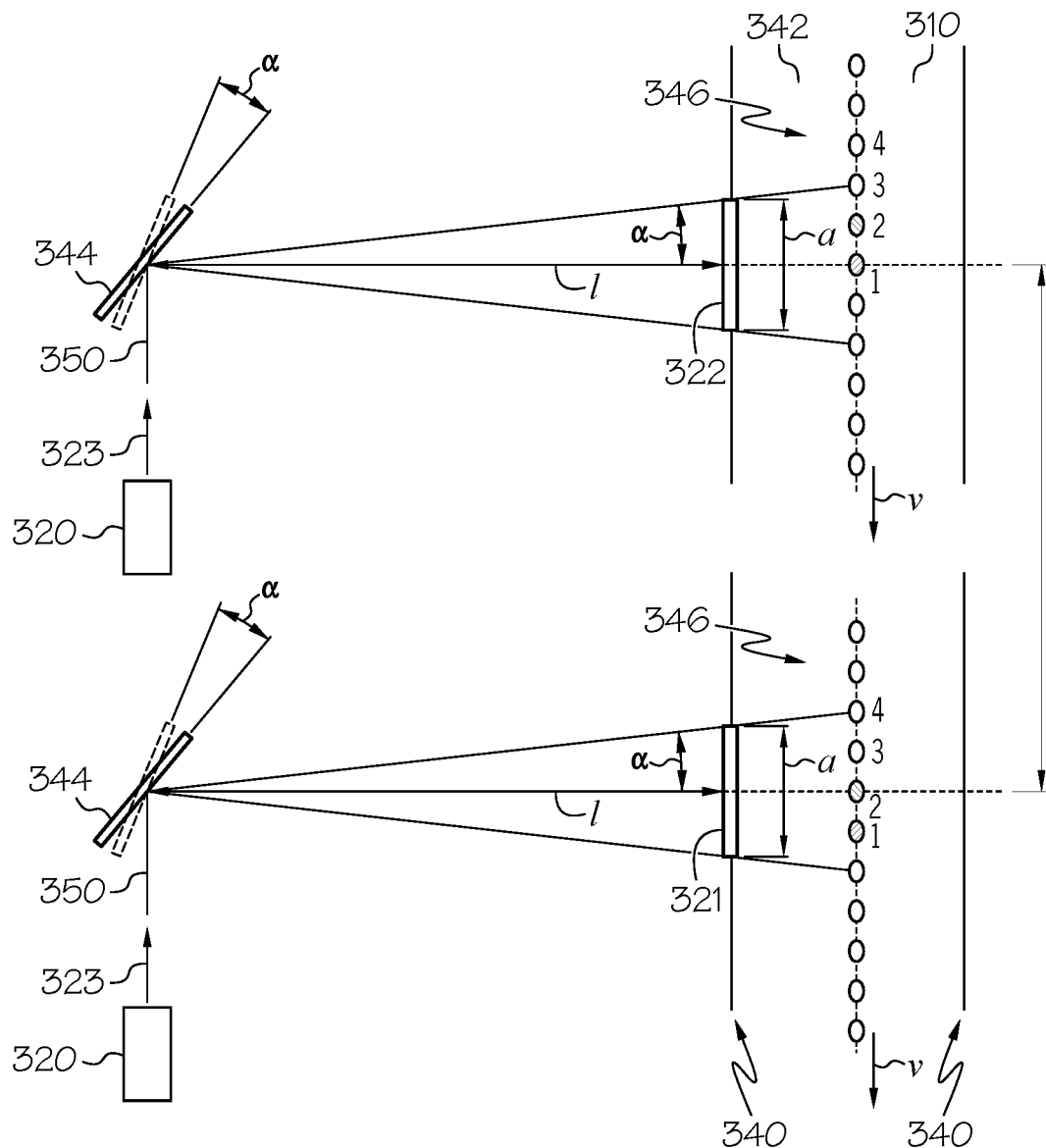
FIG. 4 illustrates another embodiment of a storage ring having an optical pathway/optical transmission system for processing qubits in accordance with one embodiment.

FIG. 4 illustrates another high-level view of the architecture for performing laser operations and storing information in a storage ring, generally designated 310. Ring 310 includes two vacuum chamber walls 340 defining a vacuum chamber 342. As illustrated, an optical pathway/optical transmission system (at least one window 322 or two or more windows 322/321 for example) is defined by and in the storage ring 310, in the vacuum chamber wall 340, and in optical communication with the vacuum chamber 342 and one or more lasers 320 coupled to optical cables 350 generating laser light/pulse 323. As illustrated two windows 322 and 321 respectively are defined in vacuum chamber wall 340, enabling lasers 320 to process the at least one qubit 346.

As illustrated, ring 310 further includes at least one deflector 344 in optical communication with lasers 320, fiber optic cables 350 and windows 322/321. In the illustrated embodiment, the least one deflector 344 comprises two acoustic optical deflectors. It should be appreciated that while two lasers, two cables, two windows, and two optical deflectors are shown, more than two lasers, windows and deflectors are contemplated. Alternative embodiments contemplate one laser in optical communication with more than one optical deflector, and/or a plurality of lasers in optical communication with one window and one deflector.

It should be appreciated that, in one or more embodiments, the deflectors places the laser pulse into the same inertial reference frame as the ions. In one or more embodiments, a sequence or line of fibers, where the deflection is done externally to the bunch of fibers, serves the same purpose. The fibers act similarly to the windows but allow the laser pulse to be set closer to the ions. The deflectors may be internal or external to the vacuum system.

Figure 5:
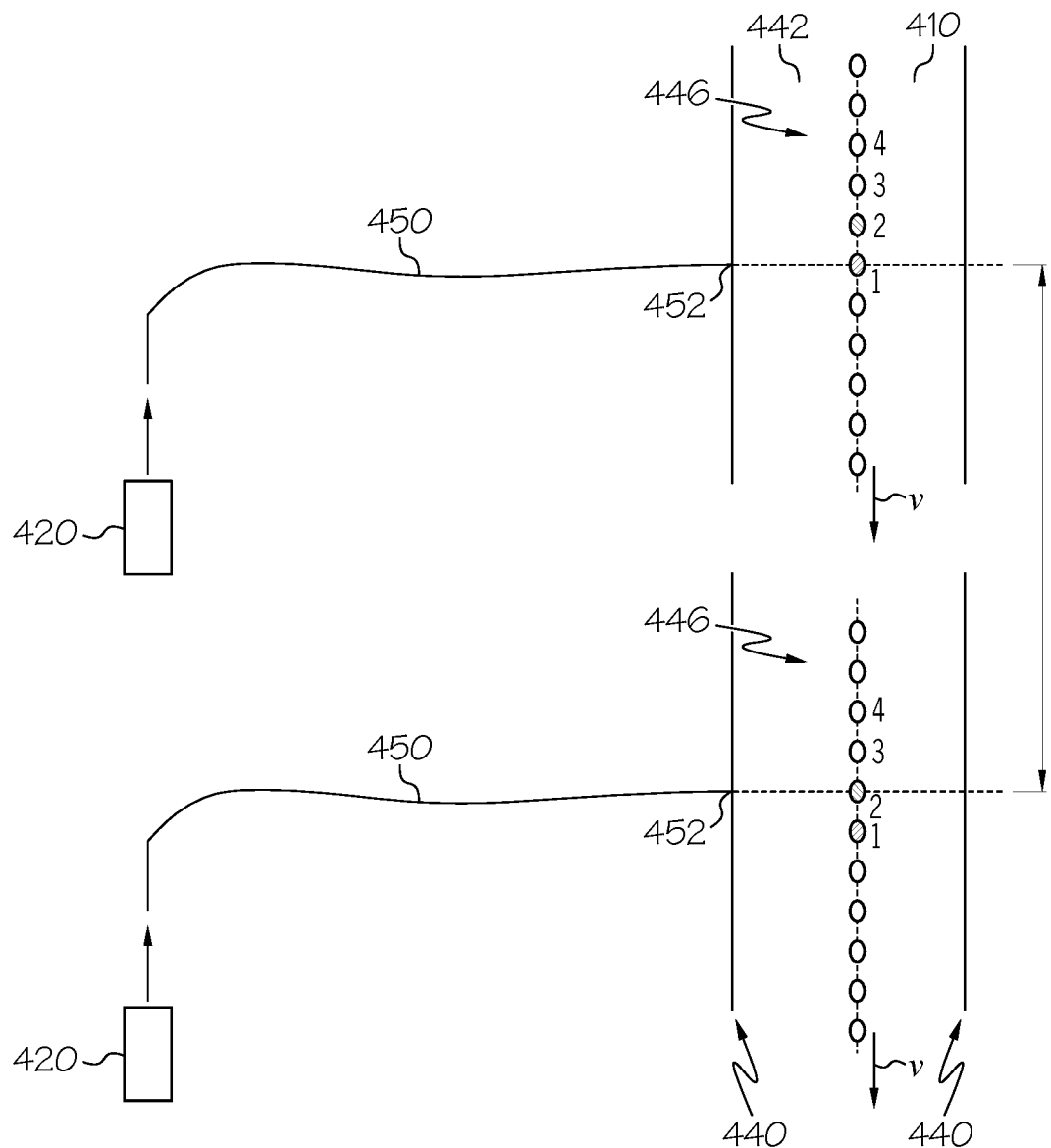
FIG. 5 illustrates yet another embodiment of a storage ring having an optical pathway/optical transmission system for processing qubits in accordance with one embodiment.

FIG. 5 illustrates another high level view of the architecture for performing laser operations and storing information in a storage ring, generally designated 410. As illustrated, ring 410 includes two vacuum chamber walls 440 defining a vacuum chamber 442. An optical pathway/optical transmission system (at least one window fiber optic cable 450 and feed trough 452 defined in vacuum chamber wall 440 or two or more fiber optic cables 450 and feed troughs 452 for example) is shown in optical communication with the vacuum chamber 442 and one or more lasers 420, enabling lasers 420 to process the at least one qubit 446, cooling the qubit 446.

In any of the embodiments described herein, for a large depth circuit, a number of operations/stages may be performed in the limited time window with the first set of lasers and then the (stable) qubit ions rotate to a succeeding set of lasers (be they in the same window or a succeeding window) to continue operations. This may be performed multiple times, each time extending the depth of the circuit implemented. This method may be used to implement cascades of different quantum circuits which overall would constitute a very large depth quantum "circuit". It should be appreciated that the width of the circuit (number of qubits for the circuit) is determined by the number of lasers at one location and/or the size of the window.

It is contemplated that, in at least one embodiment, the storage ring may operate in a serial spaced relationship or serial mode of operation: That is, the storage ring may use one laser bank/window to process one or more L ion/qubits for one or more than one stage(s) (depth wise) of circuit. Then those L qubits rotate away to the next laser bank/window, bringing into view a subsequent one or more L ion/qubits to be processed by the one laser bank/window. The one (original) L qubits may then be processed by a subsequent laser bank/window.

Figure 6:
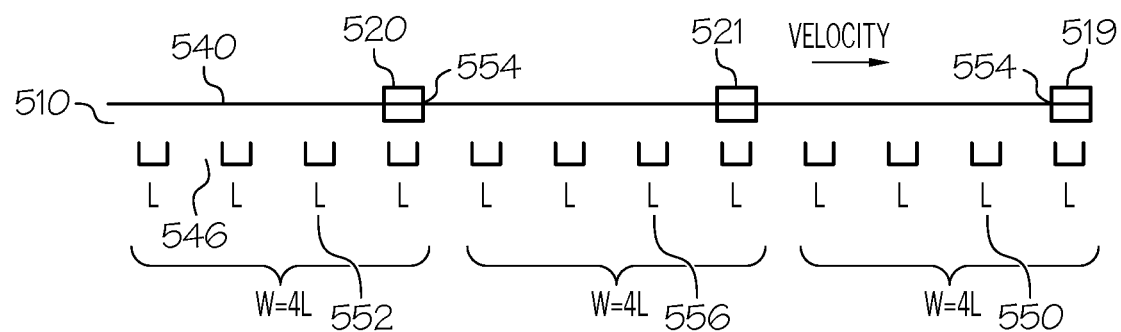
FIG. 6 illustrates a block diagram illustrating a serial mode of operation in accordance with one embodiment.

FIG. 6 depicts a serial mode of operation (when sub-circuits do not overlap) of a storage ring 510. The ions move with velocity v (illustrated in the figure as moving from left to right). Three laser banks 519, 521, and 520 are shown in optical communication though one or more windows 554. The storage ring 510 may have anywhere from one laser to multiple laser banks depending on its size and configuration. Ions 546 are divided into bunches of L ions each. Ions are uniformly spaced around the storage ring 510. As an example, in FIG. 6 the width W is shown to be 4 L. That is W=4 L.

It should be appreciated that the serial mode is most suited for a circuit with triangular topology or initial triangular topology moving in through the circuit in a depth-wise sense.

FIG. 6 depicts a serial mode of operation (when sub-circuits do not overlap) of storage ring 510 having vacuum chamber wall 540. Subcircuit or chain 550 is processed first by the laser bank 520. Once sub-circuit or chain 550 is processed by laser bank 520, it rotates to the next laser bank 521 in the direction of the arrow with velocity v. Sub-circuit or chain 552 is processed by the laser bank 520 while sub-circuit or chain 550 is processed in parallel by laser bank 521 and subsequently 519 in more depth (moving left to right in FIGS. 7-8). The shifting continues until the first four sub-circuits or chains 1, 2, 3, 4 are processed by the first four laser banks 520, 521, 519, 517.

Figure 7:
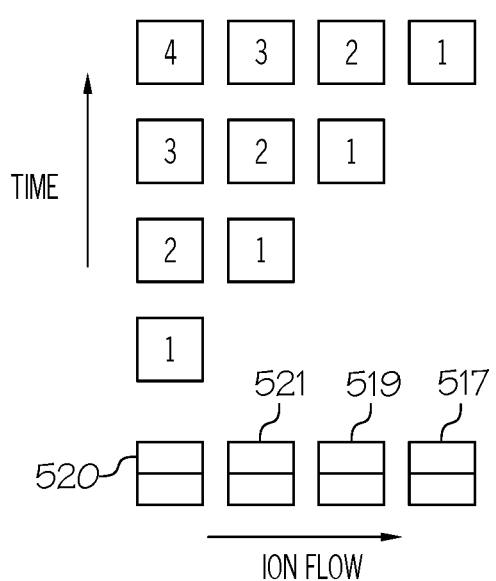
FIG. 7 illustrates another block diagram illustrating the serial mode of operation in accordance with one embodiment.
Figure 8:
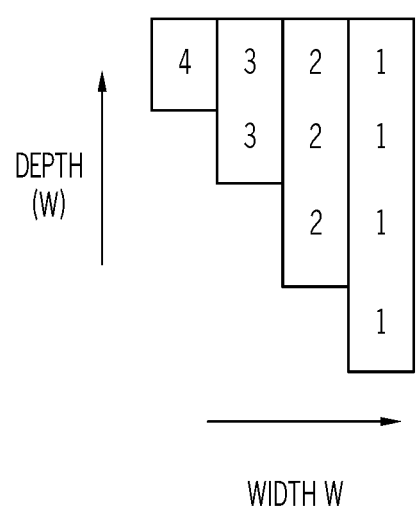
FIG. 8 illustrates yet another block diagram illustrating the serial mode of operation in accordance with one embodiment.

Once all four sub-circuits 1, 2, 3, 4, are processed by the laser banks 517, 519, 521 and 520, the ith sub-circuit will have been processed i times in a depth-wise sense (see FIGS. 7-8). It should be appreciated that all four sub-circuits are processed by the lasers, further processing will be in more of a parallel sense (see parallel mode illustrated in FIG. 9) resulting in a trapezoidal topology circuit.

Figure 9:
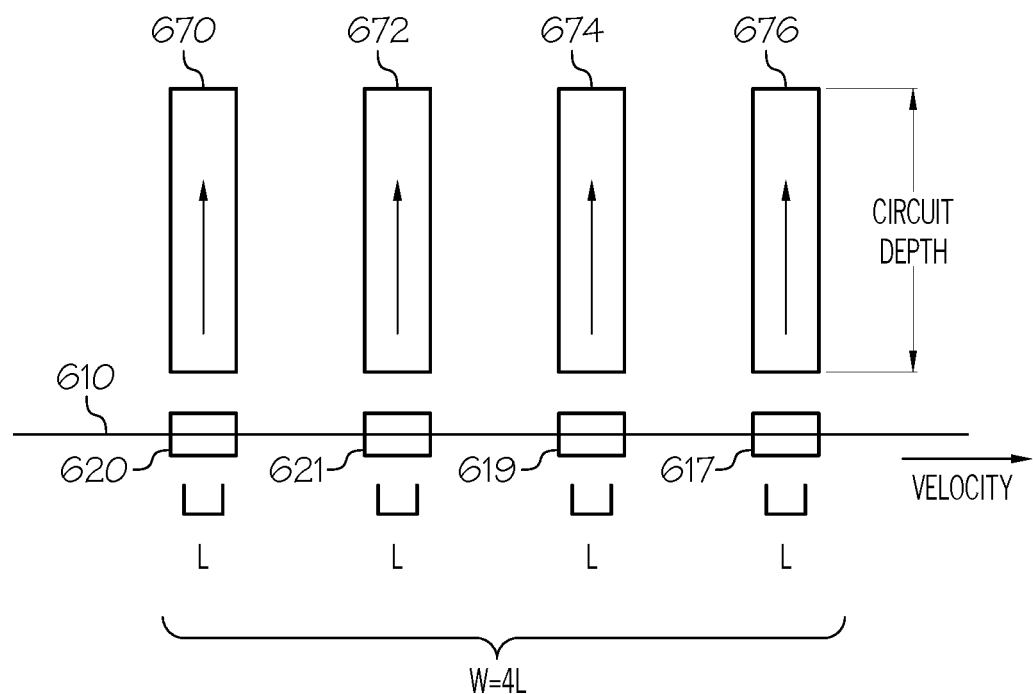
FIG. 9 illustrates a block diagram illustrating a parallel mode of operation in accordance with one embodiment.

FIG. 9 depicts a parallel mode of operation (when sub-circuits do not overlap) of a storage ring 610. In one embodiment, there are L ions per laser bank in series along the SRQC 610. The total width (in ions) of the circuit is W. Each laser bank 620, 621, 619, 617 processes W/L ions 670, 672, 674, 676 concurrently. The laser banks process the first stage (depth-wise), then the second stage, and so on (see FIG. 9). The processing continues until a certain depth/until the ions rotate away, perhaps to another set of laser banks (including some of the original ones) to continue the processing in an increased circuit depth sense. The overall circuit topology is rectangular (consider serial mode without the initial triangular circuit topology).

As illustrated there are four bunches of ions 670, 672, 674, 676 in the circuit width W or W=4 L. Four laser banks 620, 621, 619, 617 (in the same or different optical paths/optical transmission systems—windows and/or fiber optic cables) are shown programming a width 4 L circuit to some depth. It should be appreciated that the ions are uniformly spaced. If more depth-wise processing is required, the ions can rotate to a successive group of laser banks (which may either partially overlap the original group of laser banks or not overlap the original group of laser banks).

In one or more embodiments it is possible to have a hybrid mix of serial and parallel modes of operation.

In one or more embodiments, the lasers shown in the figures and discussed herein are adapted to generate laser light/pulse and process at least one qubit in a storage ring.

Figure 10:
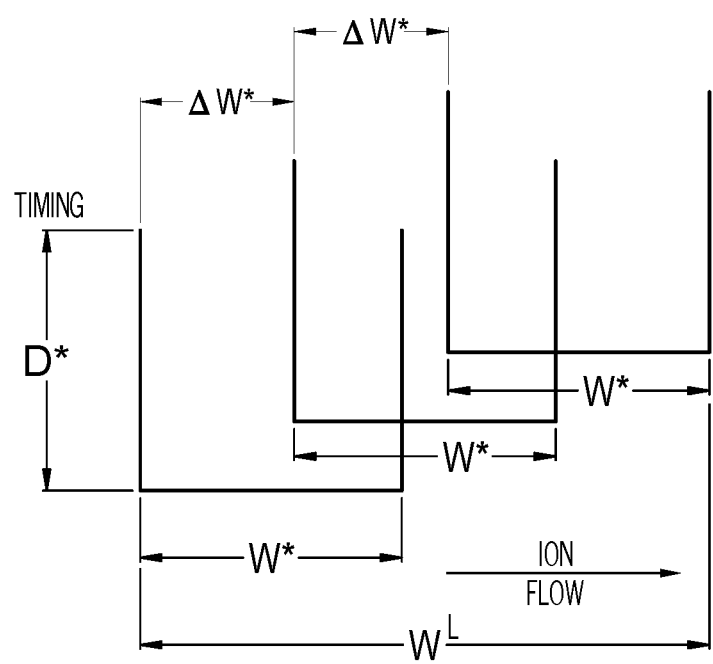
FIG. 10 illustrates a timing diagram for the present invention.

FIG. 10 illustrates a timing diagram, depicting the timing of processing one or more qubits. As provided, D is the overall depth and W the overall width of the (native gate) circuit to be implemented. W* is the maximal width and D* the maximal depth of the part of the circuit (sub-circuit) that a laser bank can implement in one pass.

In the serial mode (See FIGS. 6-8) the entire circuit width, W, is contained within W* (only one sub-circuit). The circuit is brought under the first laser bank and programmed to as much depth D* as possible. Then as the ions rotate around the storage ring they move by amount $\Delta W^{*\prime}$ (moving to the right in the diagram by amount $\Delta W^*$) and are programmed by one or more of the same lasers and/or different lasers from the next bank to an additional depth D* each iteration.

The total number of passes needed to map a D depth circuitry is then $$\left[\frac{D}{D^*}\right].$$

Here [x] is the smallest integer greater than or equal x. $W^L$ is the width of the laser banks required to accomplish this.

So, the circuit width W* comes into view of the lasers first followed by $$\left(\left[\frac{D}{D^*}\right]-1\right)$$

shifts of the circuit $\Delta W^*$ each. A timing equation that finds $W^L$ in terms of the parameters is:

$$W^L = W^* + \left(\left[\frac{D}{D^*}\right]-1\right)\Delta W^*$$

This is the result where the entire circuit width, W, is contained within W* (only one subcircuit).

For the serial mode, $\Delta W = W^*$. In this sub-circuit W* is shifted completely each iteration by W* (no overlap). Then by substituting $\Delta W^* = W^*$ into equation (1), the width of the laser banks being used ($W_L$) is:

$$W^L = W^*\left[\frac{D}{D^*}\right]$$

Finally in the parallel mode (See FIG. 9) in the first pass the initial width of the laser banks used ($W_L$) is W. Then each time the circuit is slid by one laser bank the width of the laser banks used is increased by W*. Thus $$W^L = W^* + \left(\left[\frac{D}{D^*}\right]-1\right)W^*$$

An alternative technique for a large depth circuit, is to transfer qubits whose time under the lasers is about up to locations that will come under the lasers/window next using swap gate(s) operations or teleportation. In that way, the entire circuit may be implemented at one set of lasers. This extends the depth of the circuit as additional qubits are brought in to serve to continue the calculations of one circuit. This technique may be used to implement cascades of different quantum circuits, which would constitute a very large depth quantum "circuit".

In one or more alternative embodiments some or all the gates in a circuit have at least one output qubit location that is different from the input qubit location of that gate. In such a situation, this may be handled as above if the output qubits of the gate(s)/circuits fit within the width of the circuit input qubits.

In one or more embodiments, if some or all the gate(s)/ circuit outputs are not within the original circuit input qubit width, with the right storage ring and quantum computing timing parameters based on storage ring quantum computing physical layout, at least some of the gate(s)/circuit output qubits can be placed in upstream or downstream for potential further use either at the same window or a different window.

It should be appreciated that in the serial mode of operation, the L ions are processed as a unit. If a gate receives one input but doesn't immediately receive the second input, the gate can wait until the next bunch of L ions comes into view of the laser bank so that the second input can be supplied. Ion states are long-lasting in an ion trap or storage ring (on the order of minutes) so the first input qubit can wait though further circuit operation beyond the gate.

In parallel mode, the gate in a sub-circuit (involving L ions) may have, as an example, two inputs, only one of which is accessible to a laser bank because the second input is programmed by a different laser bank. Again, in general because ion states are long-lasting, a gate input(s) can wait for other input(s) to be supplied. Hybrid implementations of series and parallel configurations may use delayed inputs as a means of solving the predecessor problem.

In one exemplary embodiment, the SRQC has a ring circumference of about 1 meter and one or more windows about 1 mm wide (although larger sizes are contemplated) and the ions have a 10 micrometer spacing (100,000 ions around the ring). There will thus be 100 ions "visible" to the lasers as they pass the window.

If the ions are traveling at a speed somewhere from 100 to 1000 m/s, a single ion will spend 10 to 1 microseconds going past the window (that is time=window size/speed).

It should be appreciated that it is possible to set, measure or excite a phonon state in about a 1 to 10 microsecond time frame. The time to write a qubit state is on the order of 1 to 10 microseconds. The time to measure a qubit state may be tens of nanoseconds.

In one or more embodiments ten 1 microsecond "actions" may be performed on a single 10 microsecond pass, but in general embodiments may only implement quantum gates of less than a depth of ten since a single gate may take several actions. However, as discussed above, multiple windows or several passes around the ring (since ions are expected to be long lasting) would allow larger depth circuits. s There is a tradeoff between ring latency and window access time. With a 1 meter in circumference ring and an ion velocity of 100 m/sec (as provided previously), the time for ions to move completely around the ring and come back to the original window locations is 0.01 sec or 10 msec or 10,000 microseconds, which appears to be a large latency overhead for a 10 microsecond pass past a window. If the velocity is increased to 1000 m/sec the ring circumnavigation time is 1,000 microseconds, still appreciable. Moreover, the time to complete a window pass now drops to 1 microsec, possibly not allowing appreciable laser operations during the pass (see above).

It should be appreciated that additional windows placed around the ring would decrease latency to some extent. If the write time can be improved by a factor of ten to about 0.1 micro seconds then an appreciable number of operations may fit into a window pass allowing a number of stages of gates to be programmed.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. An architecture for storing information in a storage ring, the architecture comprising:
   a. at least one laser adapted to target and process at least one qubit in the storage ring; and
   b. at least one window defined in a wall of the storage ring in optical communication with the at least one laser forming an optical pathway, enabling the laser to process the at least one qubit.

2. The architecture of claim 1 wherein the optical pathway comprises at least one feed trough defined in the storage ring and housing at least one fiber optic cable in optical communication with the at least one laser.

3. The architecture of claim 1 wherein the storage ring wherein the wall comprises vacuum chamber walls defining a vacuum chamber wherein the one optical pathway is in optical communication with the vacuum chamber.

4. The architecture of claim 1 further comprising at least one deflector in optical communication with the at least one laser and the optical pathway.

5. The architecture of claim 4 wherein the at least one deflector comprises at least one acoustic optical deflector.

* * * * *